United States Patent [19]

Lee

[11] Patent Number: 5,015,278

[45] Date of Patent: May 14, 1991

[54] OPEN BOTTOMED SPINNER FOR MINERAL FIBERS

[75] Inventor: Yee Lee, Reynoldsburg, Ohio

[73] Assignee: Owens-Corning Fiberglas Corporation, Toledo, Ohio

[21] Appl. No.: 491,892

[22] Filed: Mar. 12, 1990

[51] Int. Cl.⁵ .............................................. C03B 37/04
[52] U.S. Cl. .................................................. 65/6; 65/14
[58] Field of Search ................................ 65/6, 8, 14, 15

[56] References Cited

U.S. PATENT DOCUMENTS

| | | | |
|---|---|---|---|
| 2,199,309 | 4/1940 | Freudenberg | 65/15 X |
| 2,980,954 | 4/1961 | Levecque | 65/15 |
| 3,014,235 | 12/1961 | Snow . | |
| 3,017,663 | 1/1962 | Levecque et al. . | |
| 3,285,723 | 11/1966 | Levecque et al. | 65/15 |
| 3,650,716 | 3/1972 | Brossard | 65/6 |
| 3,928,009 | 10/1973 | Perry | 65/14 |
| 4,046,539 | 9/1977 | Pitt | 65/6 |
| 4,277,436 | 7/1981 | Shah et al. | 65/6 X |
| 4,483,699 | 11/1984 | Kawai et al. | 65/8 |
| 4,545,796 | 10/1985 | Crosby | 65/15 |
| 4,670,034 | 6/1987 | Goodridge et al. | 65/4.4 |

Primary Examiner—Robert L. Lindsay
Attorney, Agent, or Firm—Patrick P. Pacella; Ted C. Gillespie

[57] ABSTRACT

A spinner for centrifuging molten glass into glass fibers comprises a spinner peripheral wall having orifices for forming mineral fibers, and an annular spinner bottom wall defining an open bore, the bottom wall being connected at its outer periphery to the peripheral wall and adapted to receive a stream of molten glass, a central hub, and spoke members connecting the hub and the bottom wall to enable rotational force to be transferred from the hub to the peripheral wall, the spoke members enabling a substantial flow of air downwardly through the bore.

17 Claims, 3 Drawing Sheets

OPEN BOTTOMED SPINNER FOR MINERAL FIBERS

TECHNICAL FIELD

This invention relates to the production of mineral fibers and mineral fiber products. More specifically, this invention relates to a spinner and a fiberizer for converting molten mineral material into mineral fibers.

BACKGROUND OF THE INVENTION

The common practice in forming fibers of mineral materials, such as glass fibers, is to pass the material in a molten state to the orifices of the peripheral wall of a centrifuge or spinner to create primary fibers. Thereafter, the primary fibers are further attenuated into secondary fibers of smaller diameter by the action of a flow of gases discharged downwardly from an external annular blower. Some fiber forming processes, such as the Supertel process, use a high velocity gaseous burner for the secondary attenuation of the mineral fibers. Other fiberizing processes, such as low energy processes, use blowers only for turning the mineral fibers into a downwardly moving cylindrical veil, rather than for attenuation.

The manner of supplying molten glass to the spinner peripheral wall for fiberization varies. One method uses a distributor or slinger cup mounted for rotation radially inwardly of the spinner peripheral wall. A single stream of molten glass is supplied to the slinger cup, and the slinger cup distributes the molten glass as a multiplicity of coarse streams which are thrown by centrifugal force to the spinner peripheral wall. In such a process the spinner bottom wall serves little function, and is generally provided with a large opening or central bore.

In another process for supplying molten glass to the spinner, a single stream of molten glass is supplied to the spinner bottom wall, and the molten glass flows by centrifugal force to the spinner peripheral wall. In such a method of molten glass distribution, the spinner bottom wall is an essential element in the distribution process.

In order to improve mineral fiberization processes, it has become desirable to stabilize the veil of mineral fibers produced from the spinners. As the throughput from fiberizers is increased, and as the diameter of the spinners is increased, it becomes increasingly important to stabilize the veil of mineral fibers. The veil of mineral fibers has a tendency to "dance" or wobble in an unstable manner, and this adversely affects the distribution of mineral fibers into the insulation products being formed.

Another problem in mineral fiberization is that the veils have a tendency to collapse or neck down to a smaller diameter. This causes greater fiber entanglement and presents problems in evenly distributing the fibers into a thermally efficient insulation product. An improved system is needed to prevent the veils from collapsing.

One means for providing veil stabilization is the use of a cone attached to the spinner bottom wall. Another attempt in the past to stabilize the veil is the use of air introduced via a small conduit threaded down through the hollow quill of the spinner. These efforts to stabilize veils of mineral fibers have been only partially successful. An improved method for stabilizing the veil is needed.

SUMMARY OF THE INVENTION

There has now been invented a method and apparatus for stabilizing the veil which employs the use of massive quantities of air being drawn through or blown through a central bore in the spinner bottom wall of a mineral fiberizer. These massive quantities of air provide veil stabilization in a manner which greatly improves the mineral fiberization process. The veil stabilization enables the use of spinners of larger and larger diameters, while maintaining excellent veil distribution qualities.

According to this invention, there is provided a spinner for centrifuging molten mineral material into mineral fibers comprising a spinner peripheral wall mounted for rotation, the peripheral wall having a plurality of orifices for passing molten mineral material to form mineral fibers, an annular spinner bottom wall having an inner and outer periphery, the inner periphery defining an open bore, the bottom wall being connected at its outer periphery to the peripheral wall and adapted to receive a stream of molten mineral material and direct the molten mineral material by centrifugal force to the peripheral wall, a central hub, and spoke members connecting the hub and the bottom wall to enable rotational force to be transferred from the hub to the peripheral wall, the spoke members enabling a substantial flow of air downwardly through the bore.

Operation of the invention has been found not only to stabilize the veil, but also to expand the veil and keep it from necking down or collapsing. Further, because the veil does not collapse, fiber distribution within the insulation product is improved, resulting in a better insulation pack structure and improved thermal performance. Also, the introduction of such a large bore in the spinner bottom wall significantly reduces the weight of the spinner, thereby facilitating the ease of handling of the spinners. In addition, the significantly large flow of air introduced into the center of the veil tends to cool the veil to a greater extent than prior art processes. This increased veil cooling helps prevent binder vaporization during the binder application process.

In a specific embodiment of the invention, the bore has a radius of at least 60% of the radius of the peripheral wall. Preferably, the bore has a radius of at least 75% of the radius of the peripheral wall.

In another specific embodiment of the invention, the spoke members are adapted with an angular surface to impel air downwardly through the bore when the spinner is rotated.

In yet another specific embodiment of the invention, the spinner has vanes which are juxtaposed between spoke members, the vanes being adapted with an angular surface to impel air downwardly through the bore when the spinner is rotated.

According to this invention, there is also provided a fiberizer for making mineral fibers comprising a spinner for centrifuging molten mineral material into mineral fibers, the spinner having a spinner peripheral wall mounted for rotation, the peripheral wall having a plurality of orifices for passing molten mineral material to form mineral fibers, an annular spinner bottom wall having an inner and outer periphery, the inner periphery defining an open bore, the bottom wall being connected at its outer periphery to the peripheral wall and adapted to receive a stream of molten mineral material and direct the molten mineral material by centrifugal force to the peripheral wall, a central hub, and spoke members connecting the hub and the bottom wall to enable rotational force to be transferred from the hub to the peripheral wall, the spoke members enabling a substantial flow of air downwardly through the bore, a burner for heating the mineral material, means for rotating the spinner, a blower for turning the mineral fibers downward, and an air supply passageway positioned above the spinner and adapted to supply a flow of air to the bore.

In a specific embodiment of the invention, the spinner bottom wall, the burner, the blower and the passageway are adapted to enable an air flow through the bore within the range of from about 200 to about 1,000 scfm.

In a preferred embodiment of the invention, the air flow through the bore is within the range of from about 400 to about 800 scfm.

According to this invention, there is also provided a method of centrifuging molten mineral material into mineral fibers comprising rotating a spinner having a peripheral wall, the peripheral wall having a plurality of orifices for passing molten mineral material to form mineral fibers, the spinner having an annular spinner bottom wall having an inner and outer periphery, the inner periphery defining an open bore, the bottom wall being connected at its outer periphery to the peripheral wall and adapted to receive a stream of molten mineral material and direct the molten mineral material by centrifugal force to the peripheral wall, the spinner also having a central hub and spoke members connecting the hub and the bottom wall to enable rotational force to be transferred from the hub to the peripheral wall, the spoke members enabling a substantial flow of air downwardly through the bore, supplying molten mineral material to the spinner, and supplying a flow of air downwardly through the bore.

DESCRIPTION OF THE INVENTION

The invention will be described in terms of a glass fiber forming operation, although it is to be understood that the invention can be practiced using other heat softenable mineral material, such as rock, slag and basalt.

Figure 1:
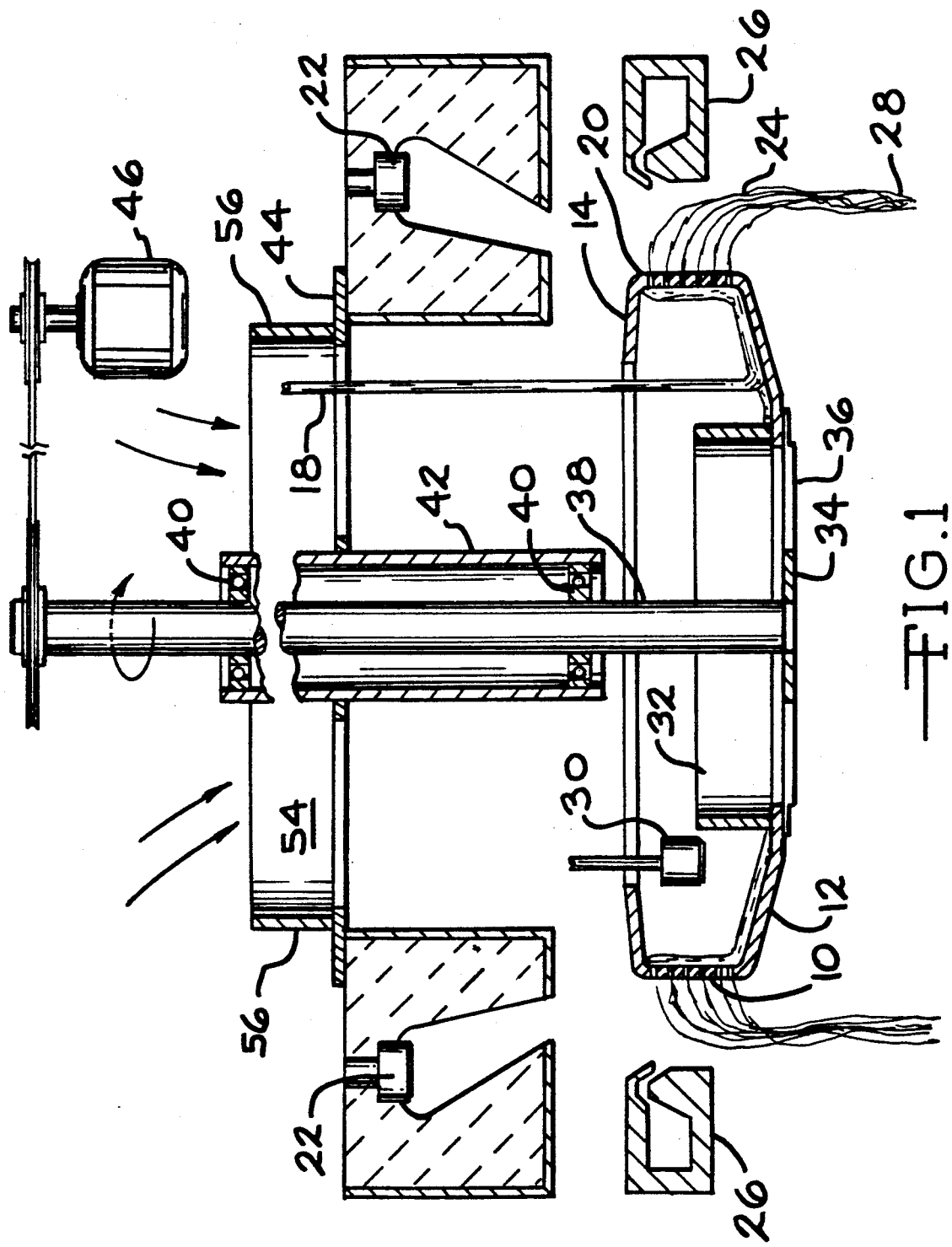
FIG. 1 is a schematic view in elevation of the fiberizer according to the principles of the invention.

As shown in FIG. 1, the spinner is comprised of spinner peripheral wall 10, spinner bottom wall 12 and spinner top flange 14. The spinner bottom wall is adapted to receive a stream of molten glass 18, and the molten glass flows by centrifugal force to the spinner peripheral wall. The spinner peripheral wall is adapted with orifices 20 for the passage of molten glass therethrough. The molten glass emanates from the spinner peripheral wall as primary fibers. The primary fibers are maintained in a soft attenuable condition by hot gases from external burner 22. The primary fibers are attenuated into glass fibers 24 of the final diameter by the action of blower 26. It is to be understood that the invention can be practiced with a low energy fiberizing method in which all of the attenuation is accomplished by centrifugal force through the orifices. The resultant glass fibers travel downwardly in a cylindrically swirling veil 28. In order to maintain the molten glass in proper condition for fiberization, internal burner 30 can be positioned to provide heat to the spinner. Preferably, heat baffle 32 is positioned radially inwardly from the spinner peripheral wall to contain the heat at the edge of the spinner.

The spinner bottom wall is attached to central hub 34 by any suitable spoke members, such as spokes 36. Therefore, the hub is indirectly connected to the peripheral wall. The hub is mounted for rotation by any suitable means, such as quill 38. Preferably, the quill is rotatably mounted in bearings 40, which are preferably mounted in an appropriate framing member such as center pipe 42, which can be supported by support flange 44. The quill can be adapted with any suitable means for rotation, such as motor 46.

Figure 2:
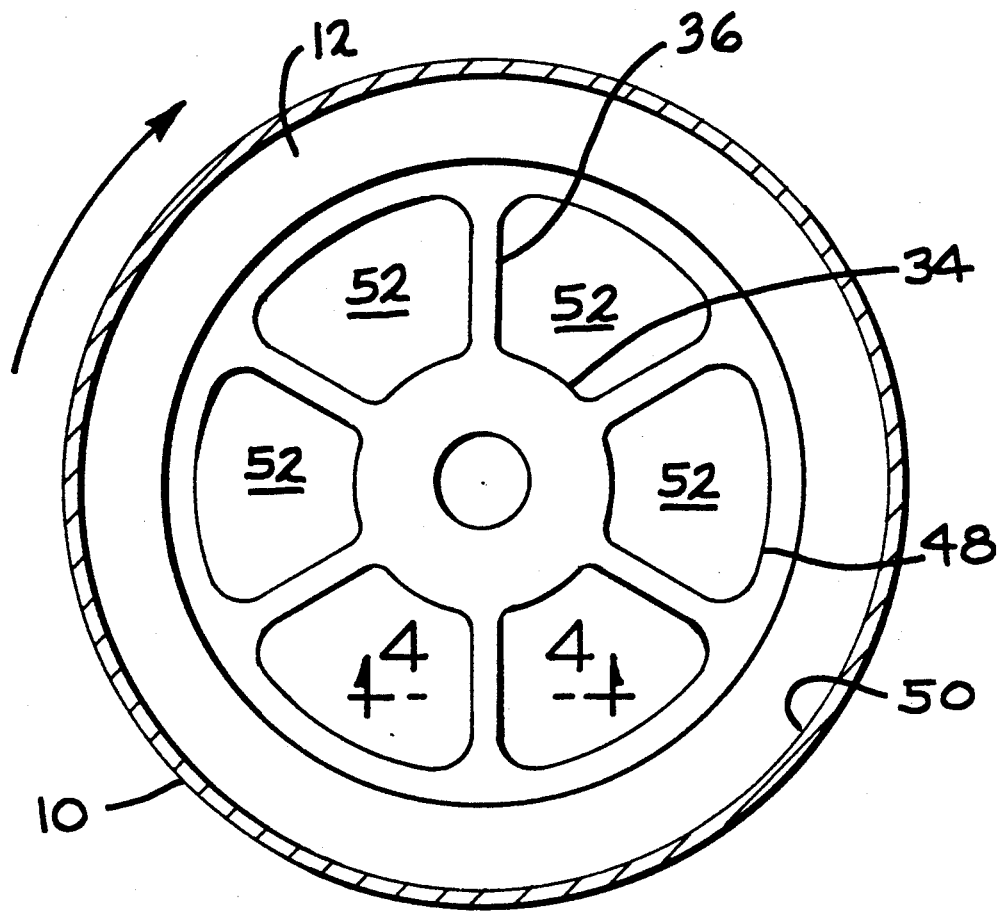
FIG. 2 is a plan view of the spinner of FIG. 1 shown from the spinner peripheral wall inwardly.
Figure 3:
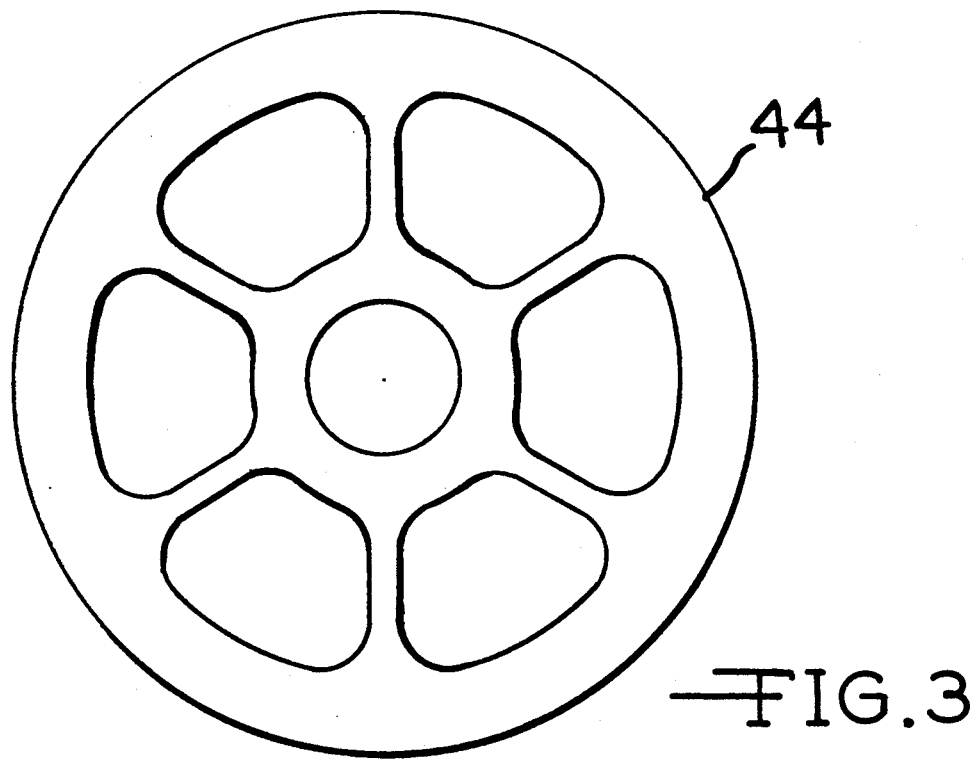
FIG. 3 is a plan view of the radial support flange.

As shown in FIG. 2, the spinner bottom wall has inner periphery 48 and outer periphery 50. The inner periphery defines an opening or bore 52 through which air flows during the fiberization process. Since the spokes connect the hub to the bottom wall to enable rotational force to be transferred from the hub to the peripheral wall, the spokes divide the bore into a series of openings.

The outer radius of the bore is the inner periphery of the spinner bottom wall. Preferably, the bore has a radius of at least 60% of the radius of the peripheral wall. Most preferably, the bore has a radius at least 75% of the radius of the peripheral wall.

Figure 4:
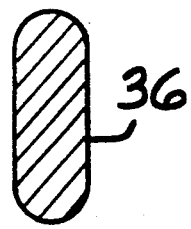
FIG. 4 is a cross-sectional view of a spoke member as shown along lines 4—4 of FIG. 2.

The spokes can be of any suitable design for supporting the spinner and providing rotational force, while allowing a substantial flow of air to pass through the bore. As shown in FIG. 4, the spokes can be generally linear in the vertical direction.

In order to provide the appropriate flow of air through the spinner bore, it is important to have free access of air above the spinner. As shown in FIG. 1, an open area or passageway 54, positioned above the spinner, enables the free flow of air downwardly through the spinner. The air flow is indicated generally by the arrows shown in FIG. 1. The passageway need only be defined as an open area to enable the free flow of air into the spinner. The passageway can be generally defined by the hardware associated with a fiberizer, shown schematically as baffle 56. In practice, the flow of air through the spinner bore is preferably within the range of from about 200 to about 1,000 scfm. More preferably, the air flow through the bore is within the range of from about 400 to about 800 scfm. This is a relatively massive amount of air relative to any previously known mineral fiberizing process, and in an amount which would be expected to freeze the coarse streams of a slinger cup method of molten glass distribution. The air supply passageway can also be a conduit, not shown, connected to a source of compressed air.

Figure 5:
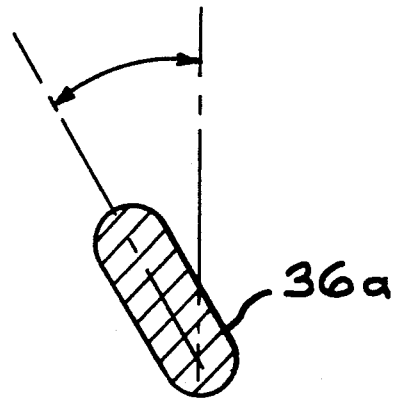
FIG. 5 is a cross-sectional view of a spoke member in an additional embodiment of the invention in which the spoke member is adapted with an angular surface to impel air downwardly.

The flow of air through the bore is induced naturally as a result of the downward blast of the blower. The downward flow of air can be enhanced by modifications to the spinner. As shown in FIG. 5, spoke 36a can be mounted at an angle or adapted with an angular surface to impel air downwardly through the bore when the spinner is rotated. This further acts to drive air downwardly and to stabilize the veil beneath the fiberizer. Preferably, the angle of orientation of the spoke would be at about 45 degrees to the vertical, although other angles would be suitable.

Figure 7:
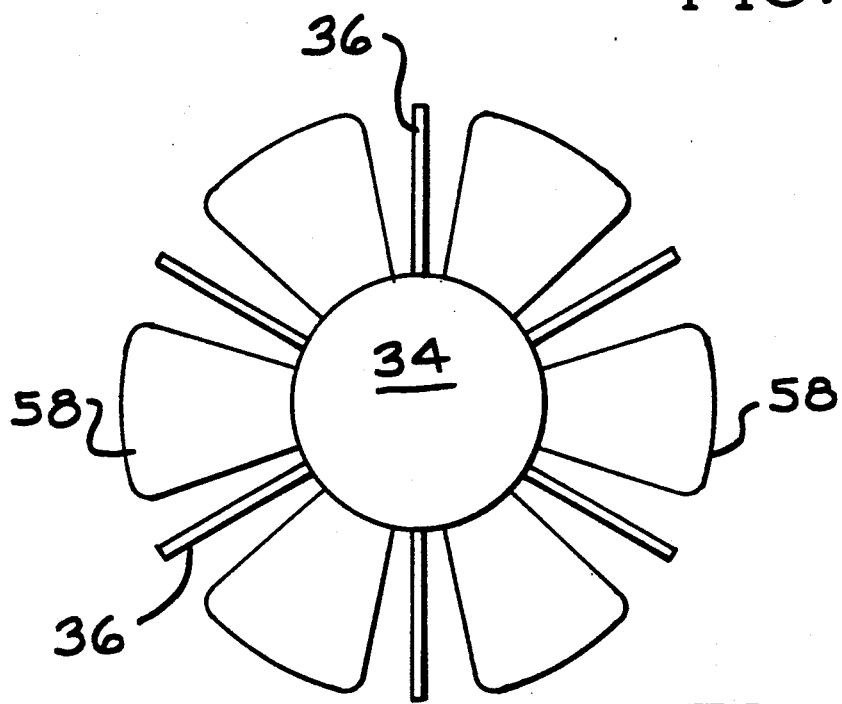
FIG. 7 is a schematic partial plan view of a hub having spokes and vanes.
Figure 6:
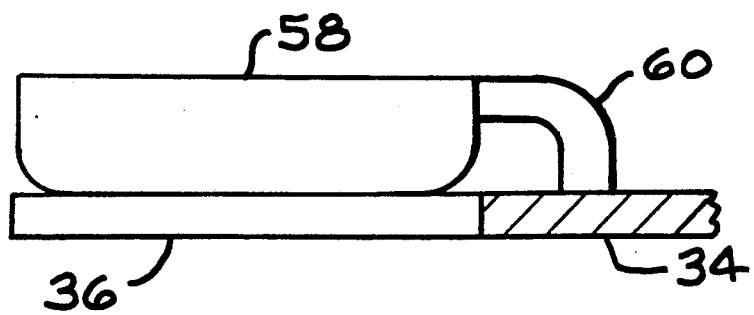
FIG. 6 is a schematic view in elevation of a spoke member and a vane mounted on the hub in order to impel air downwardly through the bore of the spinner.

As shown in FIGS. 6 and 7, an additional embodiment of the invention provides vanes 58 which can be mounted on the hub for rotation by any suitable means, such as mounting brackets 60. Preferably the vanes are juxtaposed between the spokes to drive air downwardly through the veil upon rotation of the spinner.

It will be evident from the foregoing that various modifications can be made to this invention. Such, however, are considered as being within the scope of the invention.

INDUSTRIAL APPLICABILITY

This invention will be found useful in the production of mineral fibers and mineral fiber products, such as glass fibers and glass fiber products, for such uses as thermal insulation and acoustical insulation.

I claim:

1. A spinner for centrifuging molten mineral material into mineral fibers comprising a spinner peripheral wall mounted for rotation, the peripheral wall having a plurality of orifices for passing molten mineral material to form mineral fibers, an annular spinner bottom wall having an inner and outer periphery, the inner periphery defining an open bore, the bottom wall being connected at its outer periphery to the peripheral wall and adapted to receive a stream of molten mineral material and direct the molten mineral material by centrifugal force to the peripheral wall, a central hub, and spoke members connecting the hub and the bottom wall to enable rotational force to be transferred from the hub to the peripheral wall, the spoke members enabling a substantial flow of air downwardly through the bore.

2. The spinner of claim 1 in which the bore has a radius at least 60 percent of the radius of the peripheral wall.

3. The spinner of claim 2 in which the bore has a radius at least 75 percent of the radius of the peripheral wall.

4. The spinner of claim 2 in which the spoke members are adapted with an angular surface to impel air downwardly through the bore when the spinner is rotated.

5. The spinner of claim 2 in which vanes are juxtaposed between spoke members, the vanes being adapted with an angular surface to impel air downwardly through the bore when the spinner is rotated.

6. A fiberizer for making mineral fibers comprising:
   a. a spinner for centrifuging molten mineral material into mineral fibers comprising a spinner peripheral wall mounted for rotation, the peripheral wall having a plurality of orifices for passing molten mineral material to form mineral fibers, an annular spinner bottom wall having an inner and outer periphery, the inner periphery defining an open bore, the bottom wall being connected at its outer periphery to the bottom wall and adapted to receive a stream of molten mineral material and direct the molten mineral material by centrifugal force to the peripheral wall, a central hub, and spoke members connecting the hub and the peripheral wall to enable rotational force to be transferred from the hub to the peripheral wall, the spoke members enabling a substantial flow of air downwardly through the bore;
   b. a burner for heating the mineral material;
   c. means for rotating the spinner;
   d. a blower for turning the mineral fibers downward; and,
   e. an air supply passageway positioned above the spinner and adapted to supply a flow of air to the bore.

7. The fiberizer of claim 6 in which the spinner bottom wall, the burner, the blower, and the passageway are adapted to enable an air flow through the bore within the range of from about 200 to about 1,000 scfm.

8. The fiberizer of claim 7 in which the spinner bottom wall, the burner, the blower, and the passageway are adapted to enable an air flow through the bore within the range of from about 400 to about 800 scfm.

9. The fiberizer of claim 7 in which the bore has a radius at least 60 percent of the radius of the peripheral wall.

10. The fiberizer of claim 9 in which the bore has a radius at least 75 percent of the radius of the peripheral wall.

11. The fiberizer of claim 9 in which the spoke members are adapted with an angular surface to impel air downwardly through the bore when the spinner is rotated.

12. The spinner of claim 9 in which vanes are juxtaposed between spoke members, the vanes being adapted with an angular surface to impel air downwardly through the bore when the spinner is rotated.

13. A method of centrifuging molten mineral material into mineral fibers comprising rotating a spinner having a peripheral wall, the peripheral wall having a plurality of orifices for passing molten mineral material to form mineral fibers, the spinner having an annular spinner bottom wall having an inner and outer periphery, the inner periphery defining an open bore, the bottom wall being connected at its outer periphery to the peripheral wall and adapted to receive a stream of molten mineral material and direct the molten mineral material by centrifugal force to the peripheral wall, the spinner also having a central hub and spoke members connecting the hub and the bottom wall to enable rotational force to be transferred from the hub to the peripheral wall, the spoke members enabling a substantial flow of air downwardly through the bore, supplying molten mineral material to the spinner, and supplying a flow of air downwardly through the bore.

14. The method of claim 13 comprising causing a flow of air through the bore in an amount within the range of from about 200 to about 1000 scfm.

15. The method of claim 14 comprising causing a flow of air through the bore in an amount within the range of from about 400 to about 800 scfm.

16. The method of claim 14 comprising causing air to flow downwardly through the bore by the action of an angular surface on the spoke members.

17. The method of claim 14 comprising causing air to flow downwardly through the bore by the action of vanes juxtaposed between the spoke members, where the vanes are adapted with an angular surface to impel air downwardly through the bore.

* * * * *